United States Patent [19]

Maurice

[11] Patent Number: 4,658,758

[45] Date of Patent: Apr. 21, 1987

[54] POULTRY BROODER

[76] Inventor: Paul E. Maurice, 14 Fontaine St., Ludlow, Mass. 01056

[21] Appl. No.: 844,851

[22] Filed: Mar. 27, 1986

Related U.S. Application Data

[62] Division of Ser. No. 666,115, Oct. 29, 1984, Pat. No. 4,614,166.

[51] Int. Cl.$^4$ .................................... A01K 31/20
[52] U.S. Cl. .................................... 119/32; 126/92 B
[58] Field of Search ............ 119/32; 126/92 B, 92 C, 126/92 AC

[56] References Cited

U.S. PATENT DOCUMENTS

| | | | |
|---|---|---|---|
| 1,929,088 | 10/1933 | Wood | 119/32 |
| 2,051,213 | 8/1936 | Hamilton | 119/32 X |
| 2,240,571 | 5/1941 | Olson | 119/32 |
| 2,361,097 | 10/1944 | Hess | 126/92 |
| 2,985,137 | 5/1961 | Horne | 119/32 |
| 3,027,888 | 4/1962 | DuFault | 126/85 |
| 3,429,306 | 2/1969 | Thompson | 126/92 |
| 3,503,379 | 3/1970 | Kuhn | 126/85 |
| 3,505,976 | 4/1970 | Miller | 119/32 |
| 3,976,243 | 8/1976 | Christophel | 236/6 |
| 4,144,832 | 3/1979 | Dahl | 116/22 A |
| 4,278,423 | 7/1981 | Siccardi | 432/222 |
| 4,369,030 | 1/1983 | Siccardi | 432/37 |
| 4,524,722 | 6/1985 | Siccardi | 119/21 |

Primary Examiner—Hugh R. Chamblee
Attorney, Agent, or Firm—Morgan & Finnegan

[57] ABSTRACT

A poultry brooder (10) having a ceramic radiant element (12) with protrusions (14) and protrusion connectors (16) forming spiral channels (18) to lengthen the path of flowing gases from closed center (34) to the edge of the radiant and to impede the gaseous flow by turbulence. An insulator (26) reduces heat loss through the rear surface (42) of the ceramic radiant and an adjustable temperature sensing element support bracket (32) allows selection of a variety of temperature sensing positions.

7 Claims, 8 Drawing Figures

POULTRY BROODER

This is a divisional of co-pending application Ser. No. 666,115 filed Oct. 28, 1984, now U.S. Pat. No. 4,614,166.

BACKGROUND AND OBJECTS OF THE INVENTION

1. Field of the Invention

The present invention relates to a poultry brooder and, more specifically, to a poultry brooder in which a radiant element is suspended over a heat source, such as a thermostatically controlled gas burner.

2. Description of the Prior Art

Various attempts have heretofore been made to provide an efficient poultry brooder to be suspended in a poultry house for controlling brooding temperature. Maintaining proper brooding temperature is critical to effective poultry brooding since temperature variations cause chicks to expend energy to maintain body temperature rather than to increase body weight. Expending energy to increase body weight desirably results in larger, more saleable birds and enables chicks to resist disease. Thus, poultry house temperature variation can result in smaller, less desirable birds and can cause weaker chicks to contract diseases which, in turn, may spread to other chicks. Naturally, the poultry farmer desires to maximize productivity by producing as much meat as possible for the feed consumed. The desirable result is to keep the bird warm so that the food energy contained in the feed is used to produce weight gain rather than body heat.

Structures for maintaining temperature on a poultry house floor traditionally concentrate on radiating heat downward onto the chicks, either by being supported above the floor on a pedestal or suspended from the poultry house ceiling. Prior art structures have, for the most part, concentrated on distributing heat from a small heat source, typically a gas burner, over as great a floor surface area as possible.

One such structure is disclosed in U.S. Pat. No. 3,027,888 issued to Du Fault for POULTRY BROODERS. Du Fault discloses a spiral gas burner positioned within a cylindrical perforated screen beneath a flat deflecting plate. In operation, the Du Fault spiral gas burner increases the burner surface area to heat the perforated screen and flat deflecting plate, which spread heat over the poultry house floor. A similar structure is shown in U.S. Pat. No. 3,503,379 issued to Kuhn for RADIANT HEATING DEVICE, which discloses a ring-shaped burner to heat vertical screens, all beneath a deflecting plate.

In U.S. Pat. No. 2,985,137 issued to Horne for a CHICKEN BROODER, a perforated screen radiant is configured in an inverted frustoconical shape to increase the surface area of the poultry house floor heated by this radiant. As with other perforated screen radiants, heated gas must penetrate the screen in order to heat that screen and cause it to radiate. Horne discloses a gas burner positioned above the perforated screen but below a baffle to accomplish full penetration of the screen by the hot gases. The baffle forces heated gases from the burner outward through the screen. Horne also discloses insulating the rear surface of the baffle to prevent heat from dissipating rather than being forced through the screen.

No prior art structures involving perforated screen radiants disclose any method for evenly controlling the heating of the radiant. Rather, in these structures the heated gas randomly passes or is forced through the perforated screen.

Structures which obtain more even heating of the radiant element involve inverted frustoconical ceramic elements suspended above a gas burner which contact heated gases flowing outwardly across the radiant. One such structure is disclosed in U.S. Pat. No. 3,429,306 issued to Thompson for a GAS HEATING UNIT FOR BROODER. The ceramic element there disclosed is provided with projections on the lower surface thereof. In the Thompson brooder, however, the heated gas flows across the ceramic element by a direct path through the protrusions to the edge thereof.

Another brooder involving a ceramic radiant element is disclosed in U.S. Pat. No. 3,505,976 issued to Miller for a GAS FIRED CHICK BROODER DEVICE. There, a ceramic radiant element positioned above a gas burner and having randomly positioned projections on the bottom surface thereof is disclosed. The pitch of the bottom surface of the ceramic element varies from relatively steep near the center to relatively flat or even oppositely pitched at the outer edges in order to allow hot gases to travel across the ceramic element quickly at the center and more slowly at the edges thereof. However, as in the Thompson U.S. Pat. No. 3,429,306 structure, the heated gases flow to the edge of the ceramic element by a direct path between the projections. Such direction flow does not achieve even heating of the ceramic element.

None of the prior art structures which disclose a ceramic element heated by contact with hot gases to radiate energy downwardly discloses a structure which maximizes efficient heat transfer from the hot gases to the ceramic radiant element while also preventing inefficient heat loss to the surrounding environment.

Furthermore, none of the prior art structures allows convenient temperature sensing element adjustment to accomplish temperature sensing both beneath and outside the brooder. Poultry farmers require temperature sensing in these alternative positions depending upon whether the temperature of the entire brooding house or just a section of the poultry house floor beneath the brooder is to be regulated. All of the prior art structures discussed above disclose a temperature sensing element in a fixed position beneath the poultry brooder, attached either to the underside of the canopy roof or beneath the gas burner itself. Thus, in order to alternatively regulate the temperature of both the whole poultry house or just a section of the poultry house floor the poultry farmer must inconveniently dismantle and reassemble the temperature sensing element support.

3. Objects of the Inventions

Accordingly, one object of the present invention is to provide a ceramic radiant element which is adapted to control the flow of hot gases thereover.

A further object of the present invention is to provide, in a ceramic radiant element adapted to control the flow of hot gases thereover, maximum energy transfer from the hot gases to the radiant element.

Yet a further object of the present invention is to minimize ineffecent dissipation of energy by the radiant element to the atmosphere.

Another object of the present invention is to provide, in a thermostatically controlled poultry brooder, a temperature sensing element support which alternatively permits temperature sensing to control the temperature of either the whole poultry house or a section of the poultry house floor.

A further object of the present invention is to provide, in a thermostatically controlled poultry brooder, a temperature sensing element support which may be readily adjusted between temperature sensing positions beneath and outside the poultry brooder.

SUMMARY OF THE INVENTION

Briefly described, the present invention is directed to an efficient poultry brooder including a new and improved radiant element. The radiant element is configured to force hot gases incident at its center to traverse the radiant to its periphery by a circuitous route, thereby lengthening the time that the hot gases are in contact with the radiant element and assuring efficient heating thereof. The poultry brooder according to the present invention efficiently prevents undirected heat loss from the radiant element and desirably allows adjustment of the temperature sensing element between positions for alternatively sensing the temperature beneath or outside the brooder to regulate the temperature of a section of the poultry house floor or the entire poultry house, respectively.

In accordance with a preferred embodiment of the present invention, the radiant element is an inverted, frustoconical ceramic element closed at its narrow end. Ceramic radiant projections are disposed on the bottom surface of the ceramic element in a pattern of spiral rows from the closed center to the periphery of the ceramic element. Advantageously, the projections are connected by thin walls or webbing to form passageways or channels corresponding to the spiral rows and to increase the radiant surface area of the ceramic element. The thickness of the channel walls formed by the projections and projection connectors is irregular since the diameter of the projections is larger than the thickness of the connecting wall sections. This irregularly creates turbulence in gases flowing through the channels, inhibiting the flow of the hot gases to further increase the time that the hot gases remain in contact with the ceramic element.

An insulator is provided which rests on the upper rim of the ceramic element and is thereby suspended behind the rear surface of the ceramic element. The insulator is preferably shaped to conform closely to the rear surface of the ceramic element without directly touching that surface. The preferred insulator is an alumina-silica compound which is relatively inexpensive and can withstand the high operating temperatures of the poultry brooder. Thus, according to the present invention a one-half inch thick aluminia-silica insulator exposed to a hot surface at 1,000° F., i.e., the approximate temperature of the rear surface of the ceramic element, yields a cold surface at approximately 325° F. This lightweight insulation remarkably maximizes the amount of heat and radiant energy that is retained by the ceramic element and, consequently, directed from the ceramic element toward the poultry house floor.

A variable position temperature sensing element bracket is also provided in the preferred embodiment of the present invention. The bracket is mounted on the underside of the canopy roof and may be hingedly adjusted to position the sensing element close to the ceramic element or laterally outwardly displaced from that element. Surprisingly, the adjustable temperature sensing element conveniently allows both the temperature of the poultry house floor directly beneath the poultry brooder, or of the poultry house as a whole, to be regulated, i.e., by positioning the sensing element underneath the canopy roof close to the ceramic radiant or laterally outwardly from the ceramic element, and preferably outside the canopy roof, respectively.

In a poultry brooder constructed in accordance with the present invention, hot combustion products from a gas burner rise to and impinge upon the ceramic radiant element at the closed center thereof. The hot gases flow outwardly from the center of the ceramic element, traveling through the spiral channels, to the periphery of the radiant element. Substantially all of the hot combustion products flow through the spiral channels and, when the ceramic element is level, are evenly distributed among the channels. The variations in the width of the channels created by the different thicknesses of the projections and thin connector walls or webs, respectively, create turbulence which impedes the flow of the hot gases. The spiral channels increase the linear distance traveled by the hot gases to reach the edge of the ceramic element and the turbulence created by the varied positions of the projections and connectors decreases the flow rate of the hot gases. Together, these effects maximize the surface area and length of time that the hot gases contact the ceramic element and, hence, increase the transfer of energy from the hot gases to the ceramic element.

In addition, the insulator element minimizes undirected dissipation of the energy transferred to the ceramic element to reduce the length of time required to heat the ceramic element to operating radiant temperature so that maximum radiant energy and heat can be directed to the poultry house floor. Prior art poultry brooders have substantially ignored heat loss through the non-directed surfaces of the radiant element, i.e., through the back surface thereof, but since temperature of 1,000° F. are commonly reached at such surfaces it has been found that considerable undirected energy dissipates therefrom and is wasted. The insulator element of the poultry brooder according to the present invention reduces heat loss through the non-directed surfaces of the ceramic element by effectively reducing the temperature of the exposed surface on the order of from 1,000° F. to 325° F. Thus, considerable energy savings can be accomplished by practicing this aspect of the present invention.

The temperature sensing element support bracket attached to the canopy roof assumes a variety of positions to allow the user to adjust the sensing position of the temperature sensing element. In order to control the temperature of the poultry house floor directly beneath the brooder, the bracket is adjusted so that the temperature sensing element is positioned close to the ceramic radiant. In order to control the temperature of a slightly broader region of the poultry house floor beneath the brooder the support bracket is adjusted so that the temperature sensing element detects the temperature within the brooder but not near the ceramic radiant, i.e., directly beneath the outer edge of the canopy roof. Finally, to control the temperature of the poultry house as a whole the support bracket is adjusted so that the temperature sensing element detects the temperature outside the poultry brooder, i.e., the sensing element is positioned laterally outside the canopy roof.

Thus, as one advantage of the present invention, hot gas combustion products are evenly distributed among the spiral channels to achieve uniform heat transfer to the ceramic element.

As a further advantage of the present invention, the spiral passages surprisingly confine the flow of the hot gases to a path having a linear distance which is considerably longer than the direct path from the center to the peripheral edge of the ceramic radiant element, thereby increasing the time that the hot gases remain in contact with the ceramic element to thereby maximize energy transfer thereto.

As a further advantage of the present invention, the flow of hot gases through the spiral channels is impeded by turbulence resulting from the irregular width of the spiral channels. The varied thicknesses of the projections and the connectors therebetween creates this irregular channel width and, hence, turbulence to effectively hinder the progress of the flowing gases, thereby increasing the time that the hot gases remain in contact with the ceramic element to transfer energy thereto.

As yet a further advantage of the present invention, inefficient dissipation of heat loss through the back of the ceramic element is minimized by the insulator element.

Another advantage of the present invention is that the variable position temperature sensing element support bracket allows adjustment of the temperature sensing element with heretofore unknown ease to alternatively sense temperature (i) within the brooder near the ceramic element, (ii) within the brooder away from the ceramic element, or (iii) completely outside the brooder.

BRIEF DESCRIPTION OF THE DRAWINGS

The accompanying drawings, referred to herein and constituting a part hereof, illustrate preferred embodiments of the product of the present invention, and together with the description serve to explain the principles of the invention.

DESCRIPTION OF THE PREFERRED EMBODIMENTS

Figure 1:
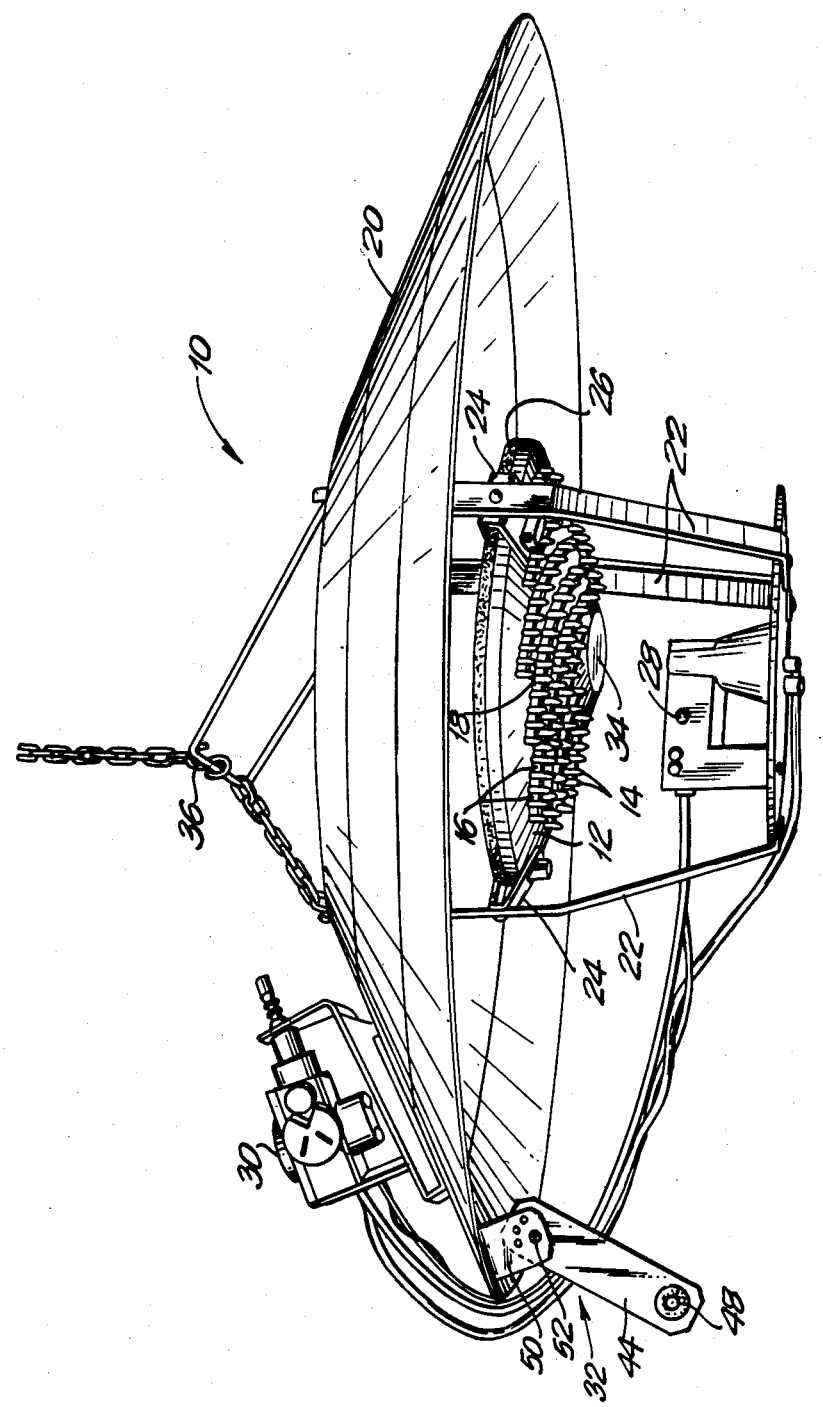
FIG. 1 is a perspective view of a poultry brooder constructed in accordance with the present invention.

Referring now more particularly to FIG. 1, there is illustrated a preferred embodiment of the poultry brooder in accordance with the present invention, indicated generally by reference numeral 10. As here embodied, poultry brooder 10 includes an inverted frusto-conical ceramic radiant element 12 having a closed flat center 34 and radiant projections 14 protruding from the bottom surface connected by thin connecting walls 16 to form spiral passageways, aisles or channels 18. The ceramic radiant 12 preferably is suspended from canopy roof 20 via suspension arms 22 and clamps 24. Clamps 24 also secure insulator element 26 in position behind ceramic radiant 12. Suspension arms 22 also support a gas burner 28 directly beneath ceramic element 12. Gas burner 28 is actuated and controlled by thermostat 30. Adjustable temperature sensing element support bracket 32 is attached to the underside of canopy roof 20 and supports a temperature sensing element (not shown) in various sensing positions. A leveling hangar 36 is provided for suspending poultry brooder 10 from the poultry house ceiling. An appropriate leveling hangar is currently available on poultry brooders marketed by Safe-glo Products, Springfield, Mass.

Figure 2:
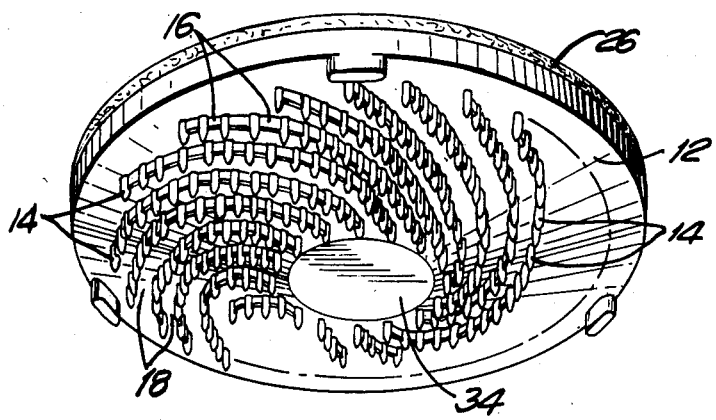
FIG. 2 is a perspective view of the radiant element shown in FIG. 1 as part of the poultry brooder according to the present invention.

As shown more particularly in FIG. 2, a perspective view of the radiant element and insulator according to the invention with reference numerals corresponding to FIG. 1, the center of the inverted frusto-conical ceramic radiant element is closed by flat center 34, which in practice is leveled by the leveling hanger 36 shown in FIG. 1. Radiant projections 14 and projection connectors 16 preferably are disposed on the bottom surface of ceramic radiant 12 in a spiral arrangement to form spiral channels 18. Connectors 16 effectively prevent gases from flowing between projections 14 other than through spiral channels 18, so gas flowing from flat center 34 to the edge of ceramic element 12 must follow channels 18. Connectors 16 also increase the radiant surface area of ceramic radiant element 12, facilitating heat transfer to the ceramic element and maximizing the emission of radiant energy therefrom. Insulator 26 is shown in contact with the rim of the ceramic radiant element.

Figure 3:
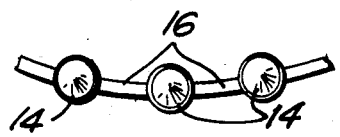
FIG. 3 is an enlarged, partial plan view of the radiant element projections and projection connectors shown in FIGS. 1 and 2.
Figure 3A:
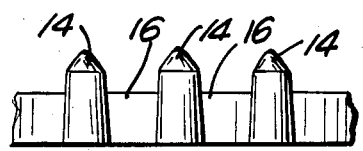
FIG. 3A is an enlarged, partial elevation view of the radiant element projections shown in FIGS. 1 and 2, wherein the projections are connected by a thin wall.
Figure 3B:
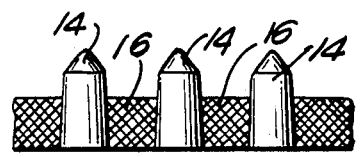
FIG. 3B is an enlarged, partial elevation view of an alternative embodiment of the invention, wherein the radiant element projections shown in FIGS. 1 and 2 are connected by thin webbing.

As best seen in FIG. 3, an enlarged, partial plan view of the radiant projections 14 and projection connectors 16 with reference numerals corresponding to FIGS. 1 and 2, connectors 16 are relatively thin in comparison to radiant projections 14. Connectors 16 effectively prevent gases from leaving spiral channels 18, which would otherwise flow between projections 14 directly toward the nearest edge of the ceramic radiant element. Therefore, in the invention as here embodied, in order for gases to flow from the center of the ceramic radiant to the edges thereof the gases must flow inside the spiral channels 18, which increases the distance travelled by the gas from the center to the edge of ceramic radiant 12. In addition, the difference in the thicknesses of projections 14 and connectors 16 creates an irregular spiral channel wall across which the gases are forced to flow. The irregular spiral channel wall thereby creates turbulence in the gas flowing though spiral channels 18, impeding its flow therethrough and thereby increasing the length of time that such gases remain in contact with the ceramic radiant element. FIGS. 3A and 3B, partial elevation views of radiant projections 14 and connectors 16, illustrate connectors 16 as thin walls and closely spaced webbing, respectively. Both the thin walls and webbing construction appropriately prevent gases from flowing directly toward the edge of the ceramic radiant element and create turbulence to inhibit the flow of gases through the spiral channels.

Figure 4:
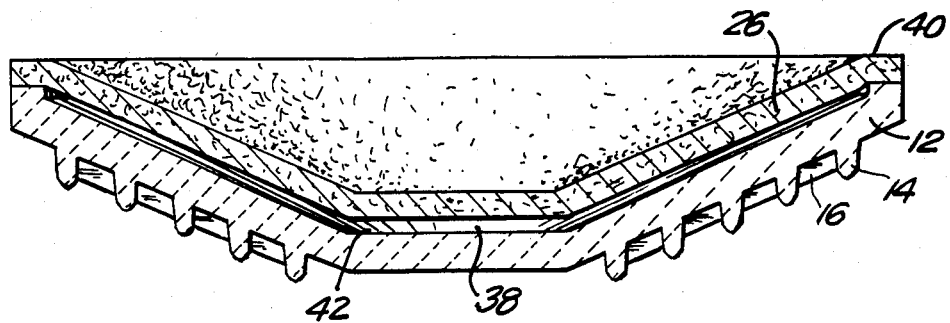
FIG. 4 is a cross-section elevation view of the radiant element and insulator shown in FIG. 1 as part of the poultry brooder according to the present invention.

FIG. 4, a cross-sectional view of ceramic radiant element 12 and insulator 26 with reference numerals corresponding to FIGS. 1-3, illustrates the preferred relationship between these elements. In the preferred embodiment of the present invention, insulator 26 is shaped similarly to ceramic radiant 12, that is, as an inverted frustoconical section closed at its lower center end. The top of insulator 26 has a outwardly projecting lip 40 which rests on the rim of radiant 12 to support the insulator over the rear surface 42 of the ceramic radiant. Preferably, insulator 26 contacts ceramic radiant 12 only at the rim as described above, creating an air gap 38 between rear surface 42 and insulator 26 as shown in FIG. 4. Air gap 38 provides further insulation of rear surface 42 in addition to that directly provided by insulator 26. Displacement of insulator 26 from rear surface 42 in this manner also prevents direct contact of the insulator with the highest temperatures of the ceramic element, thereby slightly reducing the maximum temperature the insulator must withstand. The insulator itself should be lightweight and economical but must withstand the considerable temperatures attained by the ceramic radiant. An alumina-silica mixture currently available from Ferro Corporation, Newton Falls, Ohio under the name "Thermalite" has proven satisfactory and can be readily molded to the desired shape. Typically, a one half inch thick Thermalite insulator exposed to a rear surface operating temperature of approximately 1,000° F. will yield a cold face temperature of approximately 325° F. Should the rear surface reach an operating temperature approximating 1,500° F. the cold face temperature will approximate 450° F. Thus, the energy saving of the present invention attributable to the insulator alone is significant since energy previously spent to product heat lost through rear surface 42 may now be directed toward the poultry house floor.

Figure 5:
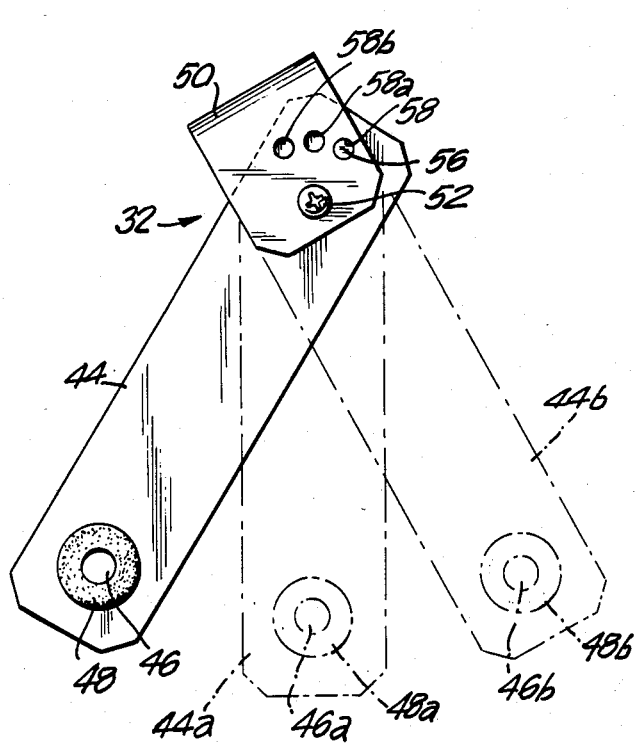
FIG. 5 is an elevation view of the variable position temperature sensing element support bracket shown in FIG. 1 as part of the poultry brooder according to the present invention.
Figure 6:
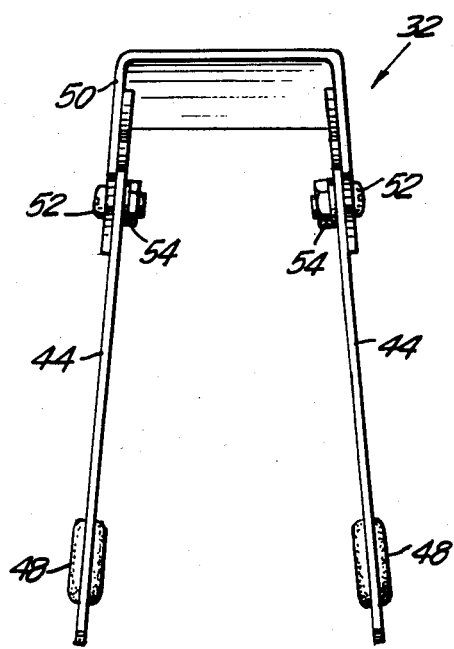
FIG. 6 is a side elevation view of the adjustable temperature sensing element support bracket shown in FIG. 5.

FIGS. 5-6 illustrate the preferred embodiment of the temperature sensing element support bracket 32 according to the present invention, with reference numerals corresponding to FIG. 1. FIG. 5, an elevation view showing temperature sensing element support bracket 32 in solid lines with bracket arm 44 in the laterally outwardly projecting position and in ghosted images in the vertical and inwardly projecting positions 44a and 44b, respectively. Bracket arm 44 is provided with a temperature sensing element aperture 46 and insulating grommet 48 at one end thereof. The insulating grommet is preferably rubber and prevents the temperature sensing element inserted therethrough and connected thereby to bracket arm 44 from being improperly affected by heat transferred from bracket arm 44. Bracket arm 44 is connected at its other end to mounting base 50 by screw 52 and nut 54. Alternatively, bracket arm 44 may be connected to mounting base 50 by a springing washer. A locking pin 56 is provided on bracket arm 32 to engage one of a variety of sockets 58, 58a, 58b in mounting base 50 to assume the outwardly projecting, vertical, and inwardly projecting positions, respectively. Mounting base 50 is attached to the canopy roof as shown in FIG. 1 by any appropriate method such as welding, screwing or bolting.

FIG. 6 is a side elevation view of the temperature sensing element support bracket shown in FIG. 5, illustrating the relationship of support arms 44 to mounting base 50. A temperature sensing element (not shown) for controlling the gas burner in conjunction with the thermostat is inserted into insulating grommets 48 across support arms 44.

In use, the poultry brooder in accordance with the invention and as shown in FIG. 1 is suspended over the poultry house floor by leveling hangar 36. The appropriate sensing position for the temperature sensing element is chosen and temperature sensing element support bracket 32 is adjusted accordingly, i.e., positioning the temperature sensing element downwardly in the intermediate position shown in FIG. 1 to regulate the temperature of a relatively large surface area of the poultry house floor, or positioning the temperature sensing element further inwardly or outwardly to regulate the temperature of only a small portion of the poultry house floor directly beneath brooder or of the entire poultry house, respectively.

Thermostat 30 activates gas burner 28, as needed, in order to product heat. Gas burner 28 produces hot gases by combustion, which hot gases rise to and impinge upon ceramic radiant element 12 at flat center 34. Since flat center 34 is leveled when leveling hanger 36 is adjusted to level the poultry brooder as a whole, the hot gases impinging upon flat center 34 are evenly distributed across that surface and uniformly enter channels 18. The hot gases flow upwardly and outwardly across the ceramic radiant element toward the peripheral edge thereof by following channels 18 defined by protrusions 14 and connectors 16. Projection connectors 16 prevent the hot gases from flowing directly to the nearest edge of the ceramic element and force the gases to follow paths defined by the spiral channels.

While flowing through channels 18, the hot gases contact the bottom surface of ceramic radiant 12, protrusions 14 and connectors 16, transferring heat from the combustion products to the ceramic radiant. The spiral path of channels 18 lengthens the distance that the hot gases must traverse in order to reach the periphery of the ceramic element, thereby increasing the amount of time the hot gases remain in contact with the ceramic radiant. The irregularity of the channel walls created by the different thicknesses of the protrusions and connectors, together with any irregularity in the bottom surface of the ceramic element itself, creates turbulence in the hot gases which inhibits the flow of the hot gases through the channels. Therefore, not only must the hot gases travel a greater distance to reach the edge of the ceramic radiant through the spiral channels than would be the case if they could flow directly between protrusions 14, but the configuration of the spiral channels creates turbulence which inhibits gas flow. These two effects combine to increase the length of time the gas remains in contact with the ceramic radiant, thereby maximizing heat transfer from the hot gases to the ceramic element. Connectors 16 also increase the surface area of the ceramic element which contacts the hot gases, also serving to facilitate greater heat transfer to the ceramic radiant. Advantageously, turbulence in the gases flowing through the spiral passageways may be further maximized by roughening the bottom surface of the ceramic element and the surfaces of the projections and projection connectors.

Insulator 26 significantly reduces the effective temperature of the exposed rear surface of the ceramic radiant, thereby saving fuel that would ordinarily be spent heating the ceramic radiant so as to compensate for the dissipation of energy through its rear surface. The insulator maximizes the operating radiant temperature of ceramic radiant element 12 and minimizes the length of heating time by gas burner 28 required for ceramic element 12 to reach operating radiant temperature. Leveling poultry brooder 10 and, therefore, flat center 34 by leveling hangar 36 also is advantageous in that it assures uniform distribution of the gases to spiral channels 18 and, therefore, uniform heating of the ceramic radiant.

Thus, it will be seen from the foregoing that the protrusions and connectors jointly increase the surface area of the ceramic element to facitate heat transfer and create the spiral channels and turbulence which lengthen the amount of time the hot gases remain in contact with the ceramic radiant, thereby acting in concert to maximize heat transfer to the ceramic radiant. The insulator reduces heat loss through the rear surface of the ceramic radiant so that a greater amount of energy is retained on the lower surface of the brooder 10 and, more specifically, ceramic radiant 12 may more efficiently radiate heat and radiant energy downwardly to the poultry house floor. Canopy roof 20 also retains the heat of the ceramic element and reflects stray radiation toward the poultry house floor.

To the extent not already indicated, it will be understood by those of ordinary skill in the art that any one of the various specific embodiments herein described and illustrated may be further modified to incorporate features shown in other of the specific embodiments, as desired.

The invention in its broader aspects therefore is not limited to the specific embodiments herein shown and described but departures may be made therefrom within the scope of the accompanying claims, without departing form the principles of the invention and without sacrificing its chief advantages.

What is claimed is:

1. In a poultry brooder having a heat radiating element facing a source of heat, the improvement comprising:
   insulating means positioned behind said heat radiating element to substantially reduce the temperature of the surface of said heat radiating element opposite the surface thereof which faces said source of heat, said insulating means being composed of an alumina-silica compound, said insulating means contacting said heat radiating element only adjacent the periphery thereof so that an air gap is provided between substantially all of said insulating means and the rear surface of said ceramic element.

2. In a poultry brooder of the type for producing radiant energy directed toward the poultry house floor including a ceramic radiant element disposed over a source of heat, the improvement comprising:
   a poultry brooder ceramic radiant element insulator disposed above said radiant element, said insulator being configured and dimensioned to closely approximate the shape of the top surface of said radiant element without touching said radiant element except at the edges thereof, said ceramic radiant element and said insulator being configured in a substantially inverted frustoconical shape closed at the lower ends thereof, said insulator closely conforming to the shape of said radiant element such that said radiant element and said insulator contact each other only at their respective circumferential edges to define a narrow air gap between substantially all of said radiant element and said insulator, said insulator substantially reducing undirected energy loss from said radiant element so as to maximize the radiant temperature of said radiant element and minimize the length of time required for said source of heat to heat said radiant element to operating radiant temperature.

3. The poultry brooder according to claim 2 wherein said insulator is composed of a lightweight alumina-silica compound.

4. In a poultry brooder of the type for producing radiant energy directed toward the poultry house floor including a ceramic radiant element facing a source of heat, the improvement comprising:
   a poultry brooder radiant element insulator positioned above the ceramic radiant element and configured and dimensioned to closely approximate the shape of the top surface of said ceramic radiant element, said ceramic radiant element having an inverted frustoconical shape closed at its lower end and said insulator having a corresponding inverted frustoconical shape closed at the lower end thereof, said insulator contacting said ceramic radiant element only at the circumferential edge of said ceramic radiant element so that a narrow air gap is provided between substantially all of said insulator and said top surface of said ceramic radiant element, said insulator substantially reducing the dissipation of energy through said top surface.

5. The poultry brooder according to claim 4 wherein said insulator is composed of a lightweight alumina-silica compound.

6. A method of maximizing the efficient transfer of energy, in a poultry brooder of the type including a ceramic radiant element having an inverted frustoconical shape closed at its lower end disposed over a source of heat, from the source of heat to the ceramic radiant element comprising:
   forming a poultry brooder ceramic radiant element insulator in an inverted frustoconical shape closed at the lower end thereof and configured and dimensioned to closely approximate the inverted frustoconical shape of the top surface of said radiant element;
   placing said insulator element above said poultry brooder ceramic radiant element such that said insulator contacts said radiant element only at the circumferential edge of said radiant element, thereby defining a narrow air gap between said insulator and said ceramic radiant element other than at said circumferential edge, said insulator maximizing the radiant temperature of said radiant element and minimizing the length of time required for said source of heat to raise the temperature of said ceramic radiant element to operating radiant temperature.

7. The method according to claim 6 wherein said insulator is formed from a light-weight alumina-silica compound.

* * * * *